(12) United States Patent
Baclawski et al.

(10) Patent No.: US 11,797,882 B2
(45) Date of Patent: Oct. 24, 2023

(54) PROGNOSTIC-SURVEILLANCE TECHNIQUE THAT DYNAMICALLY ADAPTS TO EVOLVING CHARACTERISTICS OF A MONITORED ASSET

(71) Applicant: Oracle International Corporation, Redwood Shores, CA (US)

(72) Inventors: Kenneth P. Baclawski, Waltham, MA (US); Dieter Gawlick, Palo Alto, CA (US); Kenny C. Gross, Escondido, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 949 days.

(21) Appl. No.: 16/691,321

(22) Filed: Nov. 21, 2019

(65) Prior Publication Data

US 2021/0158202 A1 May 27, 2021

(51) Int. Cl.
*G06N 20/00* (2019.01)
*G06F 16/2458* (2019.01)
*G06N 7/01* (2023.01)

(52) U.S. Cl.
CPC ......... *G06N 20/00* (2019.01); *G06F 16/2474* (2019.01); *G06N 7/01* (2023.01)

(58) Field of Classification Search
None
See application file for complete search history.

(56) References Cited

U.S. PATENT DOCUMENTS

| | | | |
|---|---|---|---|
| 2005/0154701 A1* | 7/2005 | Parunak | G06F 16/367 |
| 2010/0004900 A1* | 1/2010 | Bougaev | G01M 5/0041 |
| | | | 702/188 |
| 2010/0292959 A1* | 11/2010 | Gross | G06F 11/3072 |
| | | | 702/179 |
| 2012/0179421 A1* | 7/2012 | Dasgupta | G05B 23/0281 |
| | | | 702/181 |
| 2016/0350173 A1* | 12/2016 | Ahad | H04L 67/02 |
| 2017/0141622 A1* | 5/2017 | Meichle | H02J 50/60 |
| 2018/0060752 A1* | 3/2018 | Gross | G06F 11/3409 |
| 2018/0365571 A1* | 12/2018 | Rui | H04L 41/142 |

* cited by examiner

*Primary Examiner* — Xuyang Xia
(74) *Attorney, Agent, or Firm* — Park, Vaughan, Fleming & Dowler LLP

(57) ABSTRACT

We describe a system that performs prognostic-surveillance operations based on an inferential model that dynamically adapts to evolving operational characteristics of a monitored asset. During a surveillance mode, the system receives a set of time-series signals gathered from sensors in the monitored asset. Next, the system uses an inferential model to generate estimated values for the set of time-series signals, and then performs a pairwise differencing operation between actual values and the estimated values for the set of time-series signals to produce residuals. Next, the system performs a sequential probability ratio test (SPRT) on the residuals to produce SPRT alarms. When a tripping frequency of the SPRT alarms exceeds a threshold value, which is indicative of an incipient anomaly in the monitored asset, the system triggers an alert. While the prognostic-surveillance system is operating in the surveillance mode, the system incrementally updates the inferential model based on the time-series signals.

18 Claims, 15 Drawing Sheets

```
CREATE TABLE my_timeseries(time TIMESTAMP, F1 NUM, F2 NUM, .... FN NUM);
CREATE MODEL m1 AS
SELECT  MSET(F1, F2, F3.. FN ,
        JSON({"configuration": {"training": {
  "data.header": false,
  "time.format": "NoDate", "training.kernel": "arctangent",
  "forgetting.factor": 0.98,
  "debug": true, "author": "Kenneth Baclawski",
  "data.format": "csv",
  "description": "Examples", "training.fraction": 0.5,
  "training.extreme": "global", "data.delimiter": ",",
  "analyze.data": true,
  "kernel.approximation": "exact",
  "name": "Examples",
  "training.sortkey": "squared.norm",
  "training.windows": 1,
  "training.inversion": "pseudo",
  "statistics": "median"
}}}
'))
FROM my_timeseries
WHERE time between '2019-01-01T11:30'  AND '2019-02-01T11:30' ;

CREATE MODEL m2 AS
SELECT  MSET(F1, F2, F3.. FN)
FROM my_timeseries

ALTER TABLE my_timeseries enable MSET EVOLUTION MONITORING;

SELECT * FROM EMSET(my_timeseries);
```

FIG. 6

| Model Name | Time Range | MSET MODEL using BINARY JSON type |
|---|---|---|
| EM1 | Time between '2019-01-01' AND '2019-01-13' | MSET_EXPRESSED_AS_BINARY_JSON 1 |
| EM2 | Time between '2019-01-01' AND '2019-02-25' | MSET_EXPRESSED_AS_BINARY_JSON 2 |
| EM3 | Time between '2019-01-01' AND '2019-04-07' | MSET_EXPRESSED_AS_BINARY_JSON 3 |
| ... | ... | |

FIG. 7

```
{ "svd" : [
 [ 0.187567082724351740,  -0.307175564813876150,   0.023016717185662109,  -0.158057452466486110,
   0.046710949007575560,  -0.090326435989436150,   0.060873850567116900,  -0.036922923032548044,
   0.109144649483561270,  -0.050371459749306220,   0.244280769156728280,  -0.117349160012576280,
   0.118329249167222660,  -0.150106428115202360,   0.170211638257432350,  -0.047256338164806440,
   0.140635219992529450,  -0.300383172974441620,  -0.489749678111560033,   0.031777929493877152,
   0.254232734815742300,  -0.087119637981586260,   0.455999678101411570,  -0.207061943808511803  ],
 [ 0.210818530041729150,   0.177360883295564800,  -0.296632439228477700,  -0.056780401558643017,
   0.146499620139175600,   0.290220148377913900,  -0.082801046109051137,  -0.067148162589062245,
   0.141307533621377720,   0.188388440640753880,   0.216819267550322094,  -0.082752744423609252,
   0.077602333472474100,   0.159444146739882800,  -0.031021465751542444,   0.084732297707698600,
   0.158445207456037100,   0.079342750812790900,   0.167675355352934320,   0.214194223790201530,
   0.048294993970110875,   0.639699667575530400,  -0.149408187692903000,  -0.166312274784127600  ],
 [ 0.212385294476000240,   0.125315780816561360,   0.073816398499914590,  -0.314995620949474140,
   0.154442767911330132,   0.249685643610501100,   0.414743111767503750,   0.352373323845511000,
   0.022255144343906609,   0.146781825635609960,  -0.099882368651822150,  -0.101938368629675520,
   0.280775174674512600,   0.046181649313545410,  -0.239422628245309630,  -0.223163780705931100,
   0.207896122023147560,  -0.344576189593349400,   0.051941679592168030,   0.119961004510255790,
   0.108758090398915080,   0.129426039487583700,  -0.107520654121031180,   0.049646503908445890  ],
 [ 0.181920793319293370,  -0.324187543465539400,   0.012266923915157569,  -0.188593842840209580,
   0.038220592597890168,  -0.082914867532634980,   0.073678792037448480,  -0.052000790931797122,
   0.010959739461048553,  -0.342326615912865000,   0.046317562290797800,   0.018537565949733596,
   0.113863981051625730,   0.200601126689628120,   0.166945036520821200,  -0.155066608992351026,
   0.043875819700603970,  -0.071523731289849260,  -0.215124182847132140,   0.236883983340554020,
   0.038003720780512150,   0.252737185557930300,   0.569606112816322200,   0.292405012910272770,
   0.208347084163780700,   0.201781451104570800,  -0.151702410321817100,   0.031652506678144380,
   0.208703375749816730,   0.151525432414236720,   0.038711085016532500,   0.012288524256441459,
   0.110822791029009130,   0.060094607553414100,  -0.352522173047698840,  -0.069036250600006770,
   0.143649983099717880,  -0.382611101954080670,  -0.092045457565101950,  -0.437721418927890400,
   0.224414079894006793,   0.206623722256812400,  -0.235966832721183350,   0.046728696589023477,
   0.380254257664329740,  -0.009154695531794349,   0.007196739393636520,  -0.127137595075962400  ],
 [ 0.193980101000059680,  -0.239606492476825670,  -0.175312326083112870,   0.177985930128518880,
   0.087991326732633820,   0.216339496471163000,  -0.307951951837202750,   0.308975201347756130,
   0.364800166447040290,  -0.163148727088263220,   0.359439035358837760,  -0.075615553320251920,
   0.035858080839948039,   0.391087982433677650,  -0.176636867228729070,   0.105738490199697350,
   0.103720554007081760,   0.072189008278401160,  -0.175452771040772200,  -0.016297611413125710,
   0.131817911789648630,  -0.001759061725799191,  -0.134868584665396780,  -0.154550663625540   ],
...
```

FIG. 8

PROGNOSTIC-SURVEILLANCE TECHNIQUE THAT DYNAMICALLY ADAPTS TO EVOLVING CHARACTERISTICS OF A MONITORED ASSET

BACKGROUND

Field

The disclosed embodiments generally relate to machine-learning (ML)-based prognostic-surveillance techniques. More specifically, the disclosed embodiments relate to an ML-based prognostic-surveillance system, which continually adapts to evolving characteristics of a monitored asset, and which is supported by database system extensions.

Related Art

Enormous numbers of sensors are presently being deployed to monitor critical assets across different industries. For example, a medium-sized data center can include over 1,000,000 sensors monitoring thousands of business-critical servers, a modern passenger jet can include 75,000 sensors, and an oil refinery can include over 1,000,000 sensors. These sensors generate large volumes of time-series data, which can be analyzed using prognostic-surveillance techniques based on machine-learning (ML) to detect the onset of degradation mechanisms before problems arise. (For example, see U.S. Pat. No. 7,181,651, entitled "Detecting and Correcting a Failure Sequence in a Computer System Before a Failure Occurs," by inventors Kenny C. Gross, et al., filed on 11 Feb. 2004.)

However, nearly all existing ML-based prognostic surveillance techniques are only capable of learning a static task. This presumes that once an ML model has been trained to perform a specific prognostic-surveillance operation on historic time-series data, the ML model can be applied to perform the prognostic-surveillance operation on new data. However, dynamically evolving tasks are common in real-world environments. It is a mistake to assume that people, machines and complex systems will always behave according to unchanging patterns. People learn, machines wear out or get upgraded, large software stacks get patched, and complex integrated hardware/software systems adapt and evolve in numerous ways.

Some ML-based techniques, such as reinforcement learning (RL), explicitly modify an ML model in response to feedback. However, the RL technique still presumes that the underlying system being observed operates according to a fixed behavior pattern. RL seeks only to improve the model, not to adaptively evolve the model to accommodate changing behavior.

Moreover, because the above-described dense-sensor systems typically produce large volumes of time-series data, the data is typically stored in large-scale time-series databases. In these situations, it is advantageous to integrate the application logic, which is used to process the time-series data, into the database system itself.

Hence, what is needed is an ML-based prognostic-surveillance technique that dynamically adapts to evolving characteristics of a monitored asset, and which is supported by features in a database system.

SUMMARY

The disclosed embodiments provide a system that performs prognostic-surveillance operations based on an inferential model that dynamically adapts to evolving operational characteristics of a monitored asset. During a surveillance mode, the system receives a set of time-series signals gathered from sensors in the monitored asset. Next, the system uses an inferential model to generate estimated values for the set of time-series signals. The system then performs a pairwise differencing operation between actual values and the estimated values for the set of time-series signals to produce residuals. Next, the system performs a sequential probability ratio test (SPRT) on the residuals to produce SPRT alarms. When a tripping frequency of the SPRT alarms exceeds a threshold value, which is indicative of an incipient anomaly in the monitored asset, the system triggers an alert. Also, while the prognostic-surveillance system is operating in the surveillance mode, the system incrementally updates the inferential model based on the time-series signals.

In some embodiments, the inferential model is a Multivariate State Estimation Technique (MSET) model.

In some embodiments, incrementally updating the MSET model involves adding one or more additional components to the MSET model, and using an exponential forgetting function to adjust weights applied to older components in the MSET model to reduce contributions of the older components.

In some embodiments, incrementally updating the MSET model involves using the Sherman-Morrison-Woodbury formula to perform matrix-inversion operations involved in incrementally updating the MSET model.

In some embodiments, after a number of incremental updates have been applied to the inferential model, the system swaps the inferential model with a retrained model, which was retrained during the surveillance mode based on a set of time-series signals including recently gathered time-series signals.

In some embodiments, the inferential model is periodically retrained during the surveillance mode and is stored in a library to facilitate subsequent swapping operations.

In some embodiments, the inferential model is continuously retrained during the surveillance mode to facilitate swapping in a retrained model, which is as up-to-date as possible.

In some embodiments, the system uses a relational database management system (RDBMS), which includes structured query language (SQL) constructs that support operations involving the inferential model.

In some embodiments, the inferential model and associated mathematical operations are represented using an expression tree stored in a complex JavaScript Object Notation (JSON) record in the RDBMS, wherein an SQL-JSON function is used to manipulate the complex JSON record.

In some embodiments, the structured SQL constructs include an SQL data definition language (DDL) statement, which enables a table storing MSET monitored data to activate evolving Multivariate State Estimation Technique (EMSET) operations.

In some embodiments, the structured SQL constructs include a table function that users can call to list all EMSET models detected so far with input data after the table is activated for EMSET monitoring, which facilitates tracing an evolutional history of MSET models associated with data stored in the table.

In some embodiments, data points in the time-series signals are annotated with provenance, timestamp and weighting information.

In some embodiments, the monitored asset comprises a utility system asset.

In some embodiments, the time-series signals gathered from sensors in the monitored asset include signals specifying one or more of the following: temperatures; currents; voltages; resistances; capacitances; vibrations; cooling system parameters; and control signals.

BRIEF DESCRIPTION OF THE FIGURES

FIG. 6 presents exemplary SQL statements that facilitate EMSET processing operations in accordance with the disclosed embodiments.

FIG. 7 presents associated query results in accordance with the disclosed embodiments.

FIG. 8 illustrates contents of a model represented as a binary JSON data type in accordance with the disclosed embodiments.

DETAILED DESCRIPTION

Figure 1A:
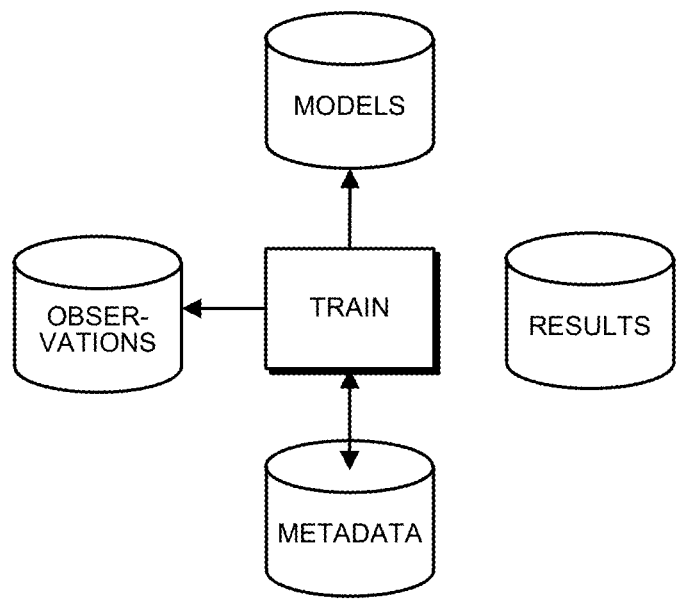
FIG. 1A presents a high-level view of a training process for a prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a new framework that supports ML prognostics for large-scale time-series databases containing data from dynamically evolving monitored systems. This new framework provides ML processing via a set of extensible SQL functions. In a preferred embodiment, it uses a variation of MSET called evolving MSET (EMSET), which continuously adapts to dynamically evolving monitored assets. By learning continuously as a monitored asset evolves, the system avoids "model inertia" through use of a novel "exponential forgetting function," which gradually "retires" parts of the model that were trained on older data, while continuously increasing "weighting factors" for newer parts of the model. Furthermore, the new EMSET technique can capture the evolution history of models derived from evolving data and can also provide provenance tracking.

Existing ML-based prognostic-surveillance systems typically rely on data stored in file systems, and they also require humans to keep track of the data and associated derived data models. This means the model-derivation and provenance-management tasks have to be explicitly performed by developers. Our new system eliminates the need for developers to perform such error-prone management tasks by incorporating the data and associated model derivation processes into an RDBMS. The system can also facilitate model evolution tracking inside the RDBMS through use of an SQL extension.

Model derivation often requires various configuration parameters, and provenance tracking involves storing and querying those configuration parameters. However, because the configuration parameters are dynamic and can vary over time for many use cases, our new system manages model derivation using a flexible JSON-based data schema. This flexible schema enables users to easily enter ad-hoc query and search configuration parameters, which are used to facilitate model-derivation and optimization operations.

The disclosed embodiments perform anomaly discovery for evolving tasks using the Multivariate State Estimation Technique (MSET). In order to adapt the system as the task and its requirements evolve, MSET is extended to adapt to new behavior by training using new data while at the same time gradually "forgetting" the parts of the model that were trained using older data. One embodiment of the present invention uses an "exponential forgetting function," wherein the flexible EMSET framework allows such functions to be used. By adjusting parameters in the exponential forgetting function, a human operator can directly specify the rate of evolution that is taking place to facilitate "subject matter expert" (SME) customization. Alternatively, the rate of evolution can itself be learned autonomously, which is advantageous for use cases where it is infeasible to have deep-level SME oversight. For these use cases, SMEs with deep knowledge monitored assets and processes, but who may not be specialists in ML prognostics, will benefit from the system optimizing the evolution of the MSET models automatically based on empirical results.

Furthermore, the EMSET automation can be controlled through an SQL extension interface, which makes it easy to use. This interface takes advantage of RDBMS capabilities to facilitate: (1) managing flexible schema data; (2) keeping track of configuration and provenance parameters for controlling the quality of learning; and (3) monitoring and applying ML to data using an RDBMS scheduler at desired time intervals.

Note that existing ML techniques are based on static models. This means that once an ML model has been developed, there is no intrinsic mechanism for evolving the model other than starting over from the beginning. While ML models can be very effective, they are also relatively expensive in terms of the time and resources required to perform a variety of tasks. For example: (task 1) ML model developers must be scheduled and, in some cases hired; (task 2) the development process itself requires time and resources; (task 3) the ML model must be integrated with other components; and (task 4) the ML model must be deployed. This means that when a new ML model is developed for a new use case, some or all of the above-listed tasks may need to be redone.

Our new system reduces or eliminates the effort required for each of these tasks by leveraging RDBMS and extended SQL functionality to facilitate the life cycle management of ML models. This affects all of the ML development tasks cited above. For example, the model is evolved in place so that no new integration (task 3) or deployment (task 4) is required. Also, while it is useful to have an experienced ML model developer who can supervise the evolution of the ML model (task 1), it is not necessary. Finally, developing a modified ML model (task 2) is considerably easier than developing an entirely new ML model. Moreover, our new technique requires no hardware upgrades in monitored assets, making this technique immediately backward-compatible with existing assets.

Figure 1B:
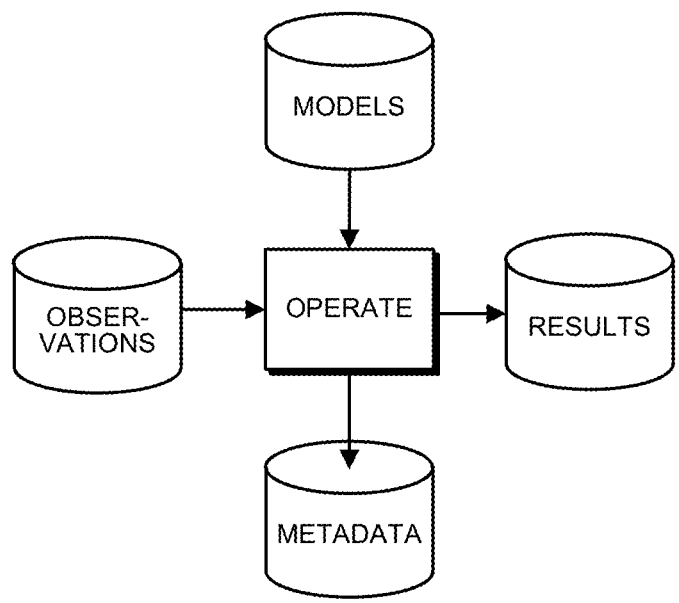
FIG. 1B presents a high-level view of normal operation of the prognostic-surveillance system in accordance with the disclosed embodiments.

The operations performed by our new system are illustrated in FIGS. 1A-1D. FIGS. 1A and 1B illustrate operations performed by existing ML solutions; namely, the development of an ML model in FIG. 1A and the operation of the ML model in FIG. 1B. While the operations illustrated in FIGS. 1A and 1B are performed by existing ML systems, the organization scheme for associated processes and data is new and has advantages over existing ML development techniques. These advantages include the following: (1) the ML model-development process is more controlled and more efficient; (2) the processes and data sets are structured to support evolution; (3) data provenance is extended to include data, process and logic provenance; and (4) each ML model is self-contained within self-describing JSON data that, (a) specifies how the ML model was derived, (b) quantitatively explains the functioning of the ML model, and (c) can be queried using standard query languages.

Figure 1C:
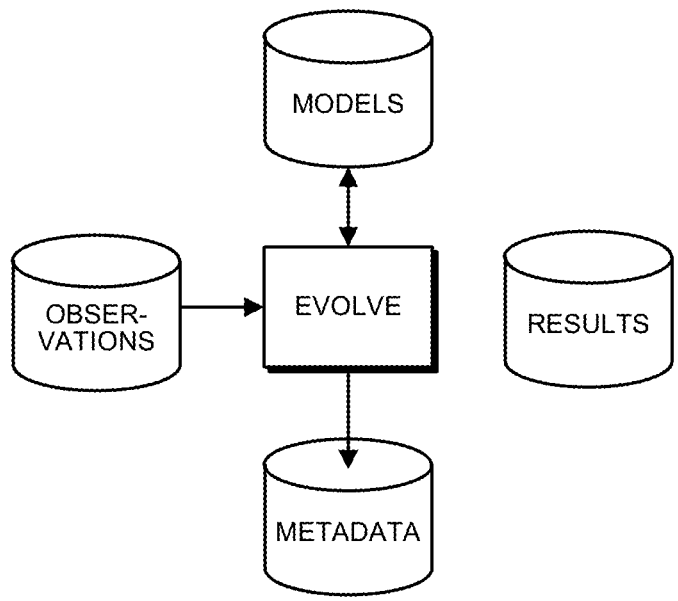
FIG. 1C presents a high-level view of an incremental updating process for the prognostic-surveillance system in accordance with the disclosed embodiments.
Figure 1D:
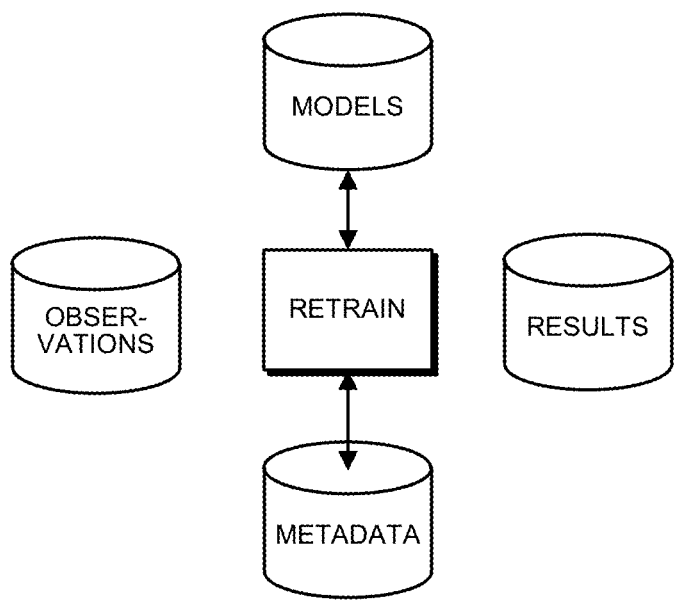
FIG. 1D presents a high-level view of a retraining process for the prognostic-surveillance system in accordance with the disclosed embodiments.

FIGS. 1C and 1D illustrate the two levels of adaptation provided by our framework, namely: (1) incremental evolution of the ML model (FIG. 1C); and retraining of the ML model (FIG. 1D). The first level of adaptation is relatively easy to accomplish, and can be performed quickly. Moreover, it can be performed online during system operation, and no significant ML development expertise is required.

The disadvantage of this level of adaptation is that over time its performance can deteriorate. (Note that in this context, the term "performance" is associated with an ultra low rate of false positives/negatives as well as a highest possible sensitivity.) To deal with this disadvantage, the framework includes a second level of adaptation, which is more difficult, and will likely be performed offline. However, the level of ML development expertise required for this second level of adaptation is still lower than is required for the initial development of the ML model. Moreover, the new ML model remains compatible with other components and can easily be deployed.

Figure 2:
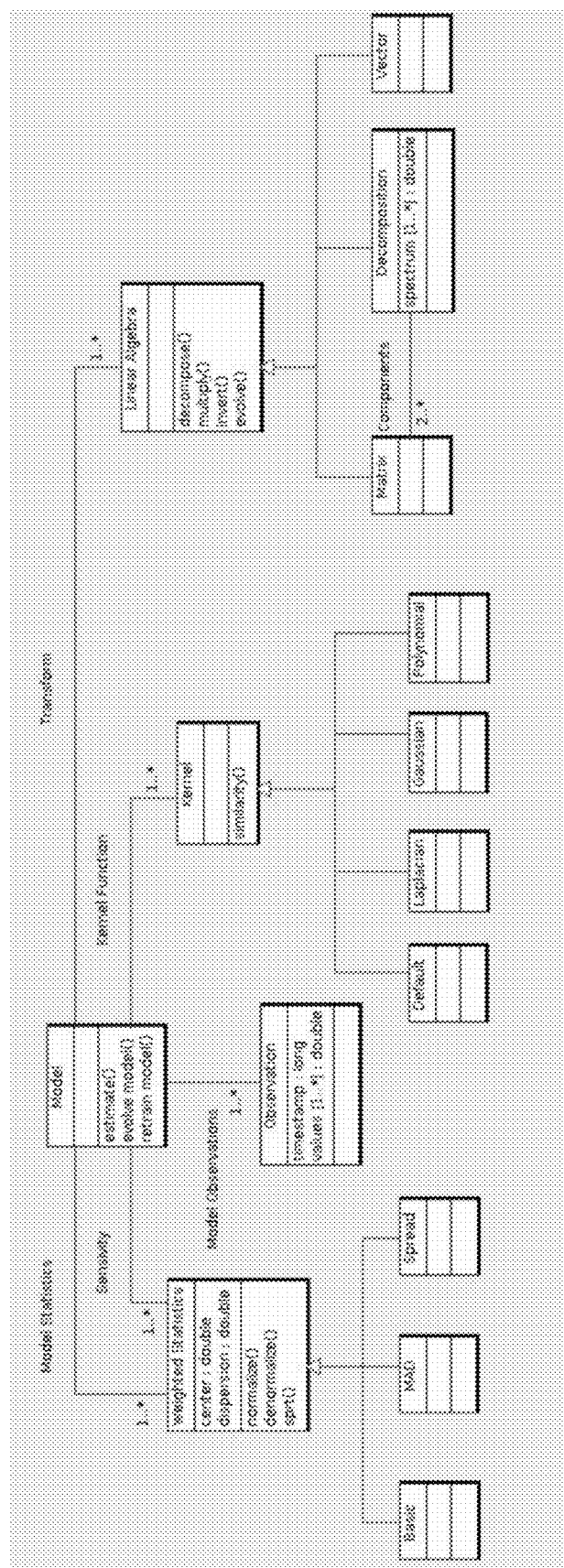
FIG. 2 illustrates an exemplary ML model transform represented as an expression tree in accordance with the disclosed embodiments.

FIG. 2 illustrates an exemplary data structure that is used by our invention. In FIG. 2, the central data structure is labeled "model" and an instance of this data structure is an ML model. Each ML model is based on representative observations of the problem being modeled. They are referred to as "model observations" in the diagram. Each ML technique includes an associated method for selecting and processing model observations. Moreover, each ML model is defined by transform functions that are typically expressed using linear algebraic techniques. Some of the most important linear algebraic notions are shown in the diagram, such as matrix operations, decomposition and spectra, but there exist many other linear algebraic structures that are well-known to persons skilled in the art. Each model also includes one or more kernel functions to deal with the nonlinear aspects of the problem being modeled. Some examples of kernel functions are shown in FIG. 2.

Each model also uses two statistical techniques. One statistical technique is the primary model statistical technique, which represents the statistical behavior of the problem being modeled by the ML model. This statistical technique models sensor measurement uncertainty. The other statistical technique is concerned with the accuracy of the ML model as an approximation of the problem being modeled. Note that the real world is far too complex to be completely modeled, so some level of approximation is necessary. Each statistical technique includes two primary statistics: the center and the dispersion, wherein the center is the central tendency of a probability distribution, and the dispersion is the extent to which a probability distribution is spread out. The primary model statistical technique uses the mean as the center and the standard deviation as the dispersion.

Exponential Forgetting Function

As mentioned above, our new technique makes use of an exponential forgetting function, which assigns weights to older entities that decay exponentially over time. At each step in the process of updating the weights, the weights are modified by multiplying by a constant. As a result, the forgetting function is referred to as being "linear." We now explain the mathematics behind a use-case-configurable exponential forgetting function, and extensions to this exponential forgetting function for non-uniform observations. This exponential forgetting function has been integrated with MSET to achieve a self-adapting process, which we call the Evolving MSET (EMSET) technique.

There exist many regression-type machine-learning (ML) techniques that can be used for anomaly discovery in time-series signals, and all of them use training data to produce a model. The training data comprises a collection of observations of the system being modeled, wherein the model includes components that are related to the training data in a complex manner. In the MSET technique, the components of the model have a structure similar to the observations in the training data. By contrast, in EMSET, each observation in the training data has an associated weight. A weight is a number that could, in principle, be any number, even one that is negative. Thus, it generalizes the MSET technique, which can be regarded as a special case in which every weight is equal to 1. The weights are propagated to the model when the model is trained.

Mathematically, a model consists of a collection $\{c_1, c_2, \ldots, c_m\}$ of weighted components. Each component $c_i$ has provenance information as well as a weight $w_i$=weight($c_i$), for i=1, 2, ..., m. The total weight $T=\Sigma_{i=1}^{m} w_i$ is assumed to be a positive number. An incremental update of the model adds additional components $\{d_1, d_2, \ldots, d_n\}$ to the model, which have weights $v_j$=weight($d_j$), for j=1, 2, ..., n. The weights $w_i$ are adjusted so that the total weight of the new collection $\{c_1, c_2, \ldots, c_m, d_1, d_2, \ldots, d_n\}$ is the same as before. In other words, if $w'_i$ is the new weight given to $c_i$, then $\Sigma_{i=i}^{m} w'_i + \Sigma_{j=1}^{n} v_j$ is equal to T. The simplest way that this can be accomplished is to set $w'_i$ equal to $kw_i$ for a constant k and i=1, 2, ..., m. By a simple calculation, one can determine that $$k = 1 - \frac{\sum_{j=1}^{n} v_j}{T}$$

is well-defined since T was assumed to be a positive number.

The most common special case is the one for which n=1 and $v_1$=1, i.e., a single component is added to the model with unit weight. In this case, the k is $$1 - \frac{1}{T}.$$

An "old" component that has had its weight modified p times with a series of unit weight single components will have had its weight multiplied by $k^p$. If r=−ln(1−1/T), then $k^p=e^{-rp}$. In other words, the weight is decaying exponentially at the rate r. Conversely, for purposes of this disclosure, the rate r is known empirically for any given use case, so that T is set to $$\frac{1}{1 - e^{-r}}$$

and therefore $k=e^{-r}$.

The analysis given so far presumed that the updates occur at uniform times. If the $i^{th}$ component has a timestamp $t_i$, then the weight of the $i^{th}$ component should be proportional to $e^{rt_i}$. Let a be the proportionality constant. Then, the total weight of the components is $T=a\Sigma_{i=1}^{m} e^{rt_i}$. We now add a new component at timestamp $t_{m+1}$ with weight $w_{m+1}$ proportional to $e^{rt_{m+1}}$. To ensure that the total weight remains the same, the proportionality constant is changed from a to ka. The weight of each component, including the new component, will then be $kae^{rt_i}$. The total weight remains the same provided that the following holds:

$$a\sum_{i=1}^{m} e^{rt_i} = T = ka\sum_{i=1}^{m+1} e^{rt_i}$$

Solving for k gives:

$$k = \frac{a\sum_{i=1}^{m} e^{rt_i}}{a\sum_{i=1}^{m+1} e^{rt_i}} = \frac{\sum_{i=1}^{m} e^{rt_i}}{\sum_{i=1}^{m} e^{rt_i} + e^{rt_{m+1}}} = \frac{1}{1 + \frac{e^{rt_{m+1}}}{S}}$$

where $S=\Sigma_{i=1}^{m} e^{rt_i}$. The constant of proportionality a can be computed using any of the weights. In particular, $w_m=ae^{rt_m}$ so $a=w_m e^{-rt_m}$. The weight of the new component is then $w_{m+1}=kae^{rt_{m+1}}=kw_m e^{r(t_{m+1}-t_m)}$.

To avoid having exponentials that are so large that they overflow the capacity of a variable, the timestamps should be relative to an initial point in time that is close to the beginning of the sequence of timestamps. For example, one could take the initial point in time to be $t_1$. It is easy to see how to adjust the formulas in this case. Using this convention, the technique for updating the weights when a new component is added at timestamp $t_{m+1}$ then proceeds as follows:

1. Set $E=e^{r(t_{m+1}-t_m)}$.
2. Set $$k = \left(1 + \frac{E}{S}\right)^{-1}.$$

3. Update the existing weights by replacing each weight $w_i$ by $kw_i$, for i=1, 2, ..., m.
4. Set $w_{m+1}=w_m e^{r(t_{m+1}-t_m)}$, where $w_m$ is the new value of the $m^{th}$ weight.
5. Update S by setting it to S+E.

The variable S is an auxiliary variable that is initialized to $\Sigma_{i=1}^{n} e^{r(t_i-t_1)}$ when the technique is (re)trained, where n is the number of initial components.

We now explain why the forgetting function is referred to as being both linear and exponential. It is linear because at every update step the existing weights are multiplied by a constant k, which is a linear modification. On the other hand, the forgetting function can be said to be exponential because the weights are decaying exponentially at rate r.

Exemplary Utility System

Figure 3:
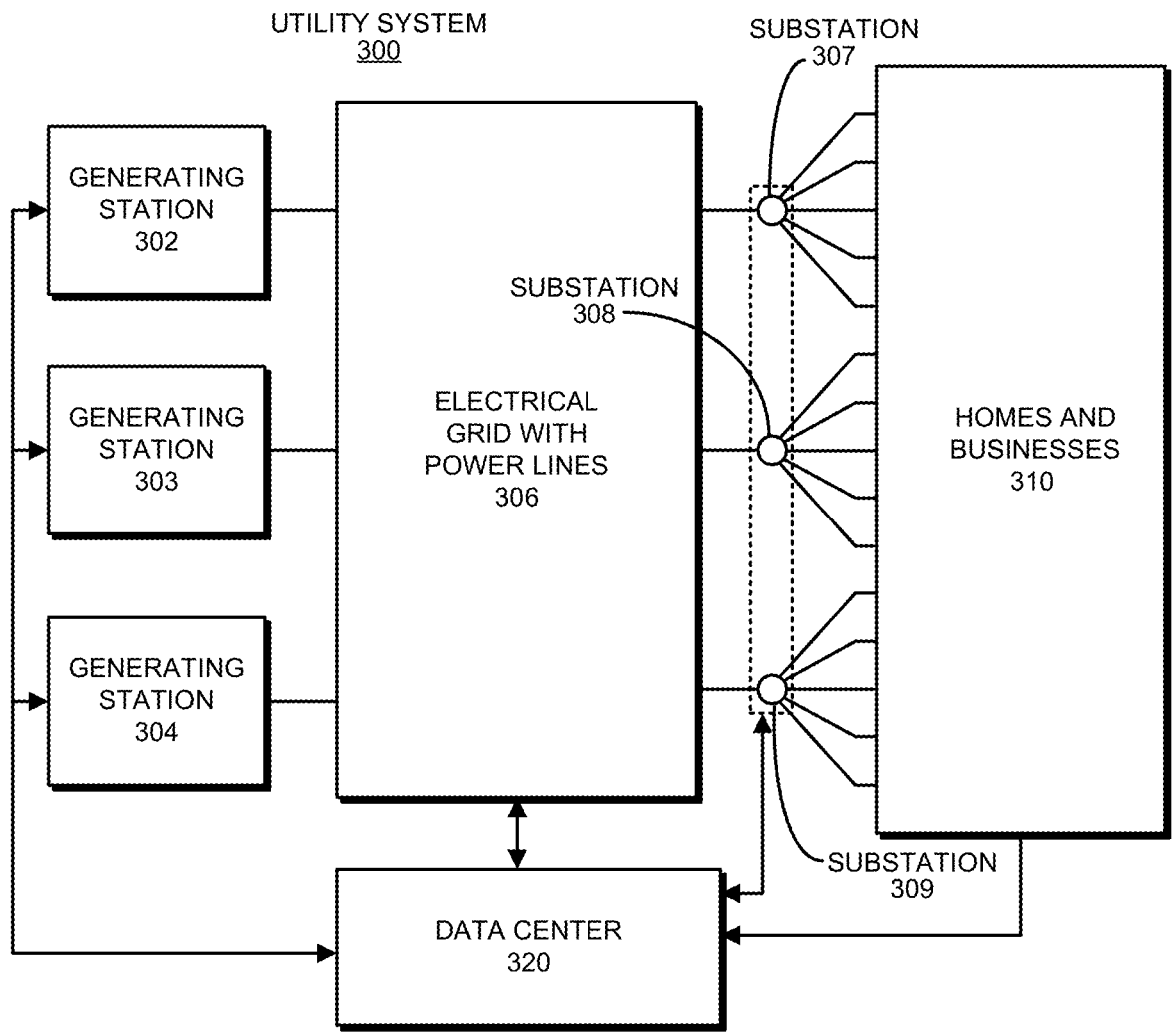
FIG. 3 illustrates an exemplary utility system use case for the EMSET technique in accordance with the disclosed embodiments.

FIG. 3 illustrates an exemplary "utility system" use case for the EMSET technique. Although, please note that EMSET can be used to perform prognostic-surveillance operations for any monitored asset that generates time-series sensor data, and is not meant to be limited to such utility system assets.

FIG. 3 illustrates a utility system 300 comprising a set of generating stations 302-304 connected to homes and businesses 310 through an electrical grid 306 in accordance with the disclosed embodiments. Note that generating stations 302-304 can generally include any type of facility that generates electricity, such as a nuclear power plant, a solar power plant, a windmill or a windmill "farm," or a coal-fired, natural gas or oil-burning power plant. Generating stations 302-304 connect into an electrical grid 306, which includes power lines, and which can transfer electricity to homes and businesses 310 within a region served by utility system 300, and can also transfer electricity to and from other utility systems. Note that electrical grid 306 transfers electricity to homes and businesses 310 through substations 307-309, which include transformers.

As illustrated by the arrows in FIG. 3, a data center 320 receives data in the form of time-series sensor signals from the various assets in utility system 300. For example data center 320 can receive time-series signal from a coal-fired power plant in generating station 302 or from a transformer in substation 307. Data center 320 can then use these time-series signals to perform prognostic-surveillance operations on such utility system assets as is described in more detail below.

Prognostic-Surveillance System

Figure 4:
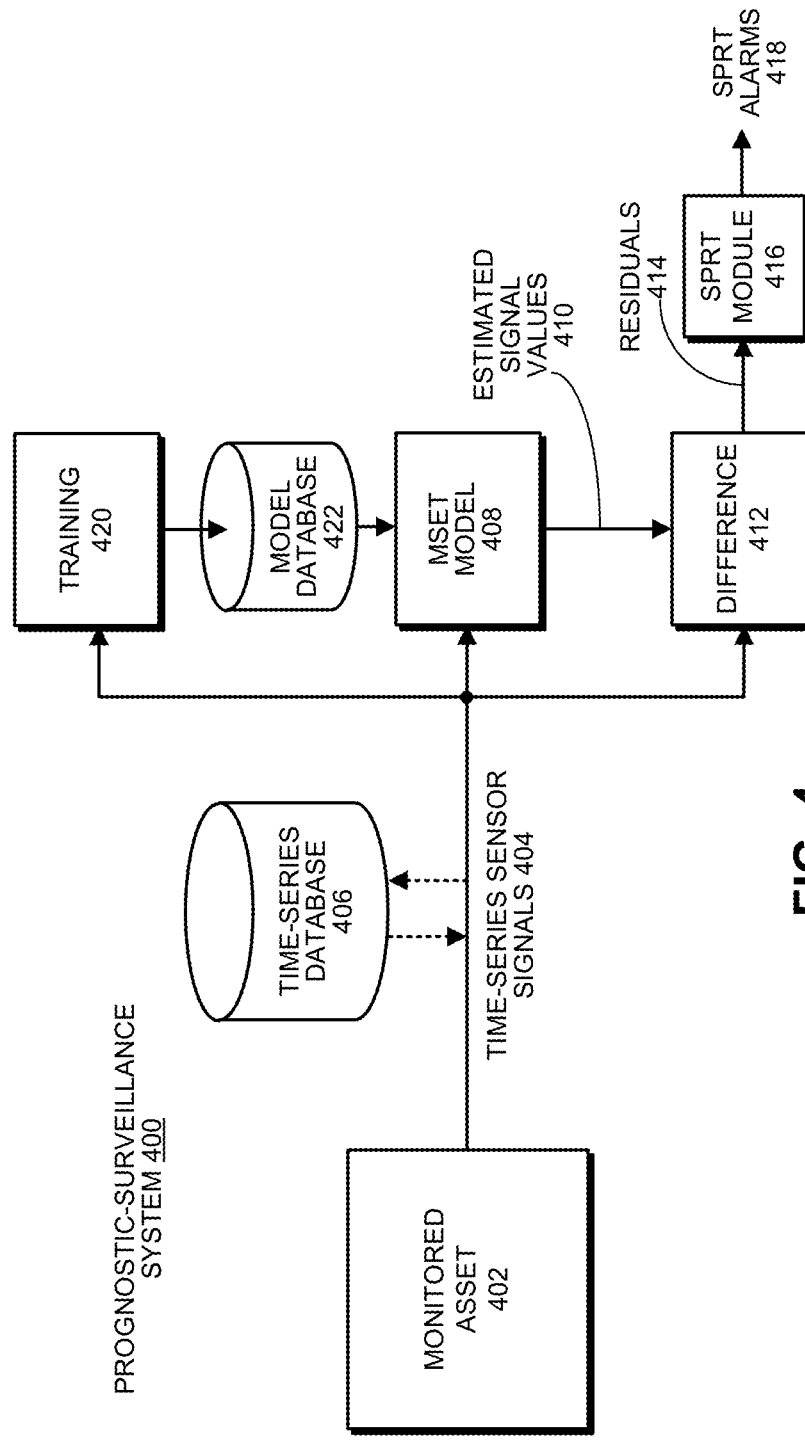
FIG. 4 illustrates an exemplary prognostic-surveillance system in accordance with the disclosed embodiments.

FIG. 4 illustrates an exemplary prognostic-surveillance system 400, which, for example, can reside within data center 320 illustrated in FIG. 3. During operation, prognostic-surveillance system 400 accesses a time-series database 406 containing time-series signals. As illustrated in FIG. 4, prognostic-surveillance system 400 operates on a set of time-series sensor signals 404 obtained from sensors in a monitored asset 402, such as a transformer or a power plant. Note that time-series signals 404 can originate from any type of sensor, which can be located in a component in monitored asset 402, including: a voltage sensor; a current sensor; a pressure sensor; a rotational speed sensor; and a vibration sensor.

During operation of prognostic-surveillance system 400, time-series signals 404 can feed into a time-series database 406, which stores the time-series signals 404 for subsequent analysis. Next, the time-series signals 404 either feed directly from monitored asset 402 or from time-series database 406 into an MSET pattern-recognition model 408. Although it is advantageous to use MSET for pattern-recognition purposes, the disclosed embodiments can generally use any one of a generic class of pattern-recognition techniques referred to as nonlinear, nonparametric (NLNP) regression, which includes neural networks, support vector machines (SVMs), auto-associative kernel regression (AAKR), and even simple linear regression (LR).

Next, MSET model 408 is "trained" to learn patterns of correlation among the time-series signals 404. This training process involves a one-time, computationally intensive computation, which is performed offline with accumulated data that contains no anomalies. This training process and associated retraining operations are performed by training module 420 and resulting trained models are stored in a model database 422.

The pattern-recognition system is then placed into a "real-time surveillance mode," wherein a trained MSET model 408, which is retrieved from model database 422, is used to predict what each signal should be, based on other correlated variables; these are the "estimated signal values" 410 illustrated in FIG. 4. Next, the system uses a difference module 412 to perform a pairwise differencing operation between the actual signal values and the estimated signal values to produce residuals 414. The system then performs a "detection operation" on the residuals 414 using SPRT module 416 to detect anomalies and possibly to generate SPRT alarms 418. (For a description of the detailed operation of SPRT module 416, please see Wald, Abraham, June 1945, "Sequential Tests of Statistical Hypotheses," *Annals of Mathematical Statistics*, 16 (2): 117-186.) The system can then determine whether an operational anomaly has occurred in the monitored asset 402 based on these SPRT alarms.

Ordinary MSET Versus EMSET

Figure 5A:
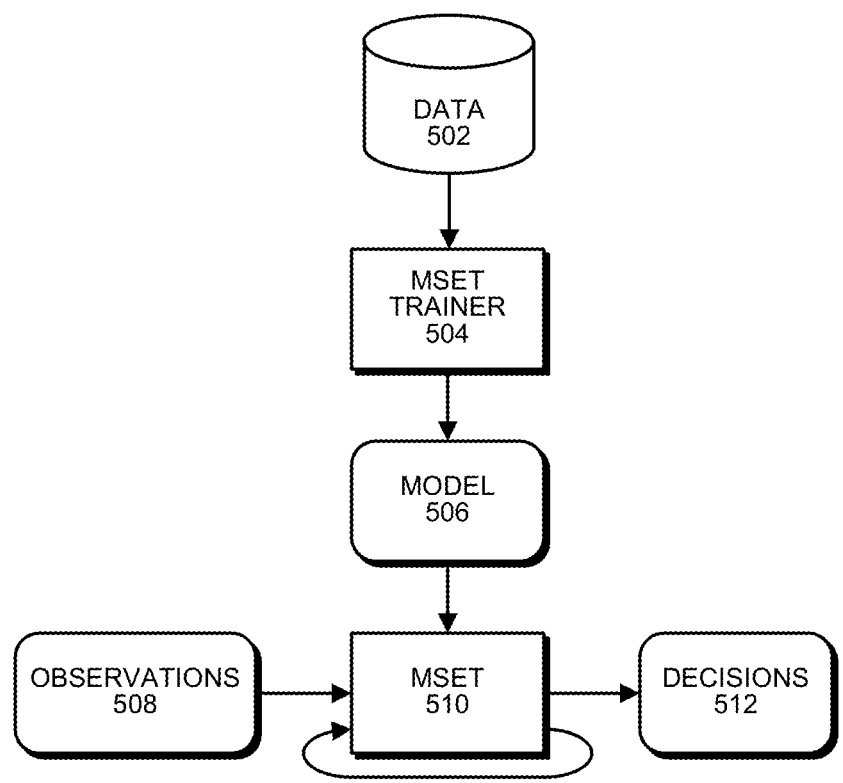
FIG. 5A presents a diagram illustrating a normal MSET system.

FIG. 5A presents a flow diagram for an ordinary use case for MSET. As illustrated in FIG. 5A, data 502 comprising time-series sensor signals is used by an MSET trainer 504 to train a model 506. This is done once for each model. The model 506 is then used by MSET module 510 to make decisions 512 (e.g., raise alarms for anomalous sensor readings) for a series of observations 508. This is the ordinary MSET operating loop. Note that the decisions are not fed back during this loop, and model 506 is not modified. Also note that detecting that a new model is needed and training it are not part of this technique.

Figure 5B:
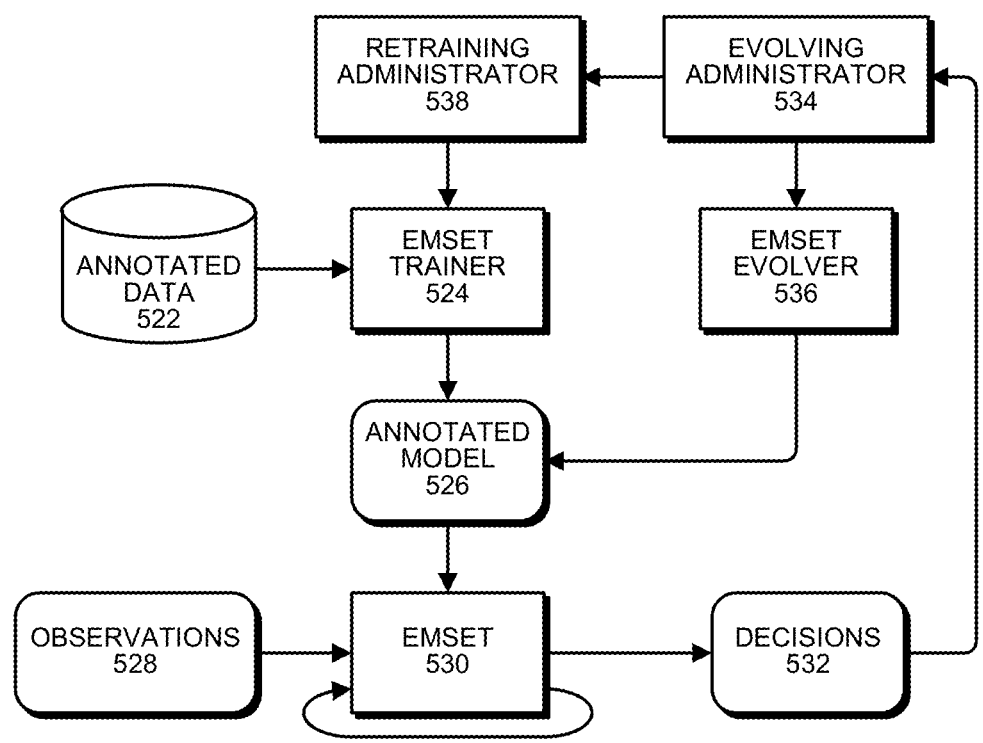
FIG. 5B presents a diagram illustrating an EMSET system in accordance with the disclosed embodiments.
Figure 5C:
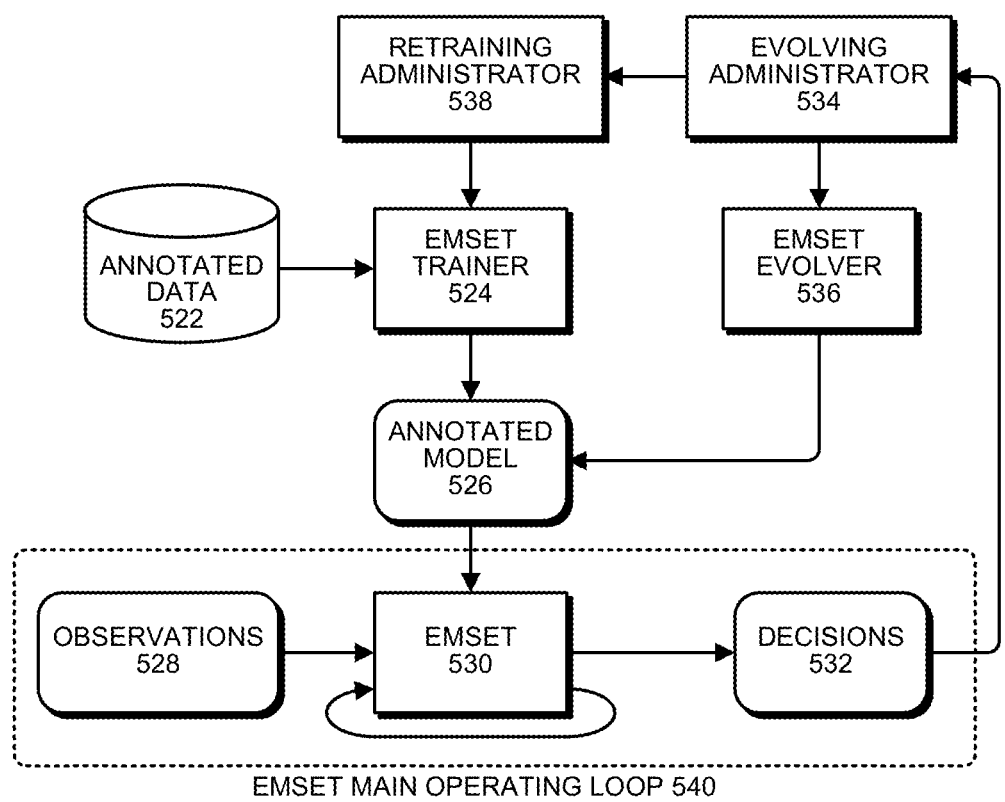
FIG. 5C presents a diagram illustrating a main operating loop for the EMSET system in accordance with the disclosed embodiments.

In contrast, FIG. 5B presents a flow diagram for EMSET. As in ordinary MSET, an EMSET trainer module 524 uses data to train a model. However, the data is annotated with provenance, timestamp and weighting information and is referred to as "annotated data" 522, wherein EMSET trainer 524 uses annotated data 522 to produce an annotated model 526. As in ordinary MSET, the annotated model 526 is used by EMSET module 530 to make decisions 532 based on a series of observations 528. Note that the decisions 532 are not fed back during this loop, and the annotated model 526 is not modified. However, unlike ordinary MSET illustrated in FIG. 5A, EMSET module 530 uses the annotations (especially the weights) during the process of making its decisions. These operations all take place in the main operating loop 540, which is highlighted by the box comprising dashed lines in FIG. 5C. Note that this main operating loop 540 is the fastest loop in EMSET.

The decisions made in main operating loop 540 are monitored by an evolving administrator module 534, which is responsible for determining whether annotated model 526 needs to be updated due to changes in the environment. During this determination process, evolving administrator 534 can employ techniques as simple as periodically updating annotated model 526, or as complex as employing another machine-learning technique to determine whether an increased alarm rate is indicative of an anomaly or caused by changes in the environment. When evolving administrator 534 determines that a new model is required, it invokes EMSET evolver module 536 instead of EMSET trainer module 524. Next, EMSET evolver 536 performs an incremental update to annotated model 526. Note that an incremental update requires considerably fewer computational operations than would be required to train a new model. Also note that the most time-consuming operation involved in training an MSET model is a very large matrix inversion operation. However, when only a small number of components are added to the annotated model 526, this matrix inversion can be performed using the computationally less expensive Sherman-Morrison-Woodbury formula. (See Sherman, Jack; Morrison, Winifred J. (1949). "Adjustment of an Inverse Matrix Corresponding to Changes in the Elements of a Given Column or a Given Row of the Original Matrix" (abstract). Annals of Mathematical Statistics. 20: 621.) The incrementally updated annotated model 526 is then used by EMSET module 530 in main operating loop 540.

Figure 5D:
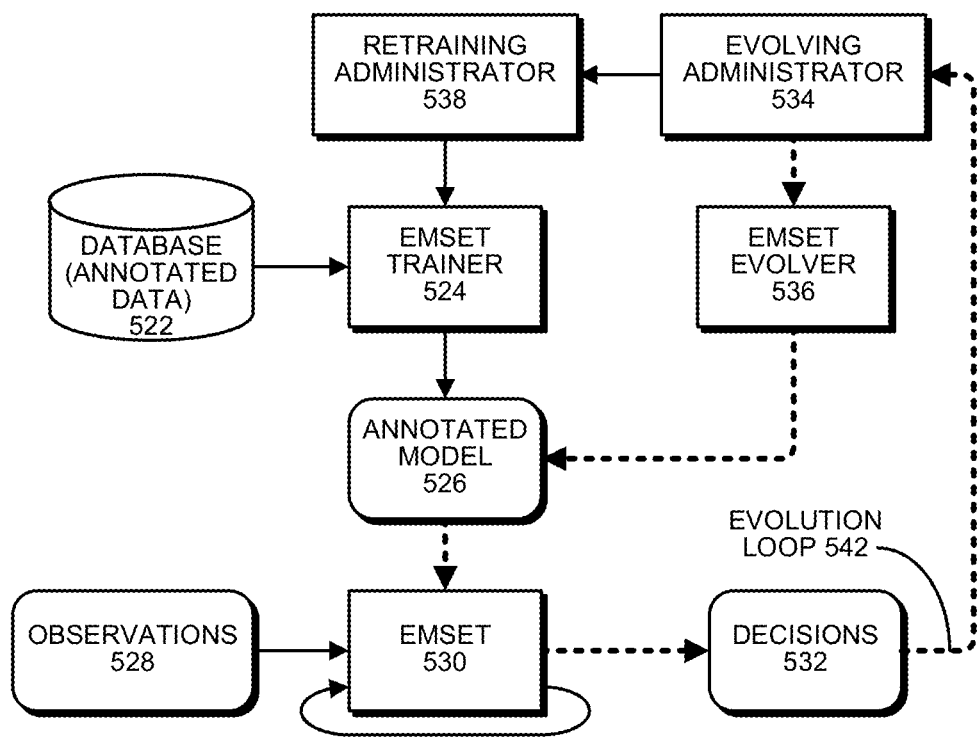
FIG. 5D presents a diagram illustrating an evolution loop for the EMSET system in accordance with the disclosed embodiments.

During operation, evolving administrator 534 manages an evolution loop 542, which is illustrated by the dashed lines in FIG. 5D. Note that evolution loop 542 is executed less often than main operating loop 540. Also note that evolving administrator 534 has access to both decisions and observations in the main operating loop 540, and these decisions and observations can be stored in a database 522, which contains annotated data.

However, evolution loop 542 has limitations. Although evolution loop 542 suffices for gradually changing circumstances, it is not sufficient for more drastically changing circumstances. Another problem is that while incremental updates to annotated model 526 are accurate when only a small number of updates are performed, accuracy is lost if too many are performed.

To deal with this problem, a retraining administrator module 538 monitors evolving administrator 534 to determine whether it is necessary to retrain annotated model 526 (for example, based on a threshold number of updates). When retraining administrator 538 determines that annotated model 526 must be retrained, it invokes EMSET trainer 524. As previously mentioned, database 522 has been augmented with additional observations and decisions, which EMSET trainer 524 uses to retrain annotated model 526.

Figure 5E:
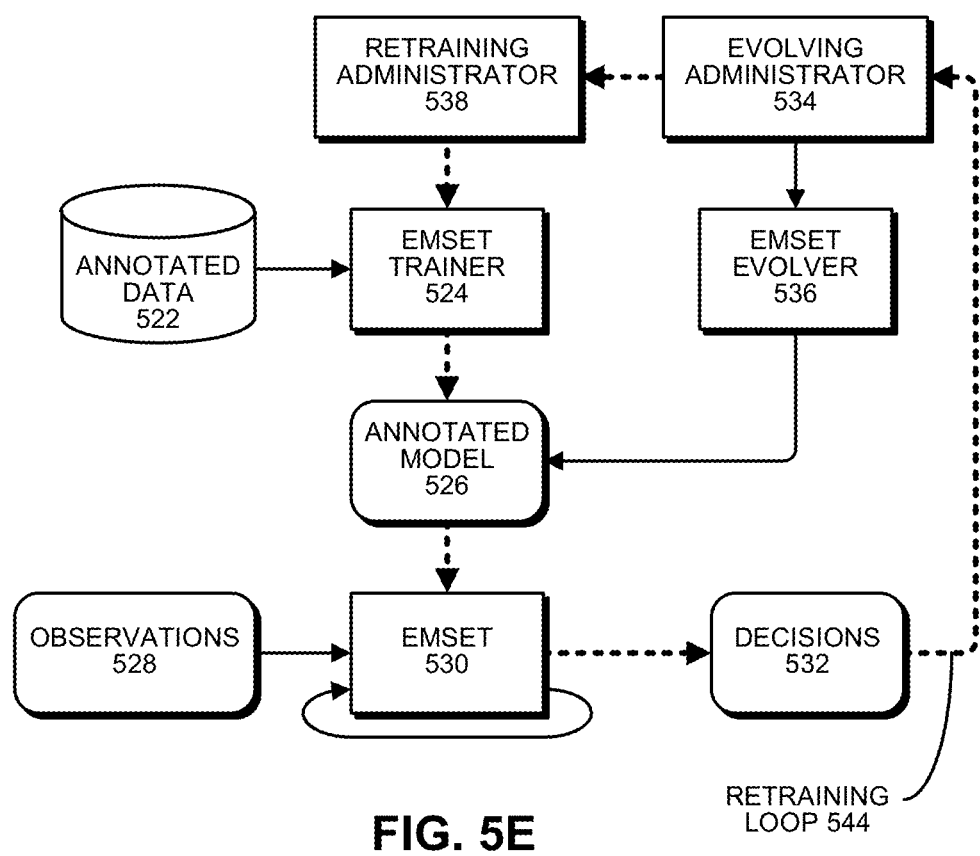
FIG. 5E presents a diagram illustrating a retraining loop for the EMSET system in accordance with the disclosed embodiments.

Retraining administrator 538 manages retraining loop 544, which is illustrated by the dashed lines that appear in FIG. 5E. This retraining loop 544 is the slowest loop because training a new model requires considerable time and effort. In practice, the retraining can be performed in parallel with other operations of EMSET. One strategy is to pretrain a library of models that can be retrieved quickly when circumstances change abruptly. This improves response time, but because the pretrained models are not necessarily reflective of the current circumstances, such a strategy is only a temporary solution until the retrained model is available. Another strategy is to continually and proactively train models in case they are needed. However, this is feasible only if sufficient computing resources are available, and rapid response time is critical.

The reason multiple incremental updates can lose accuracy is that while the heart of the training of an MSET model involves a matrix inversion, there is more to the technique. A small number of incremental updates will not have a significant negative impact on the MSET model, but as the number of incremental updates increases, the incrementally updated model will diverge from the ideal model. An incrementally updated model also increases in size compared with the ideal model, which reduces the performance of main operating loop 540, but this effect is relatively minor. The main reason for limiting the number of incremental updates is divergence from the ideal model.

Database Support

A RDBMS can be augmented to facilitate EMSET as is illustrated by the SQL statements that appear in FIG. 6. Referring to FIG. 6, these statements first create a table "my_timeseries" with a time column to record the timestamp, and a set of feature columns to record the feature observed value for a monitored asset. Note that the MSET ( ) function is an SQL aggregation function that computes a model using the MSET technique and returns a JSON type data that captures all the derived mathematical results that can be used to interpret the result.

We next determine how many evolving MSET models there are using a special SQL table function called "EMSET ( )." As mentioned above, EMSET is a variation of MSET, which continuously adapts to dynamically evolving monitored assets. By learning continuously as a monitored asset evolves, the system avoids "model inertia" through use of a novel "exponential forgetting function," which gradually "retires" parts of the model that were trained on older data, while continuously increasing "weighting factors" for newer parts of the model. Existing ML-based prognostic-surveillance systems typically rely on data stored in file systems, and they also require humans to keep track of the data and associated derived data models. This means the model-derivation and provenance-management tasks have to be explicitly performed by developers. Our new system eliminates the need for developers to perform such error-prone management tasks by incorporating the data and associated model derivation processes into an RDBMS. Exemplary results from this query are illustrated in the table that appears in FIG. 7.

Note that in a preferred embodiment, we can use an SQL/JSON expression to query the JSON data type representing the model using associated MSET input configuration parameters to maximize the full explainability (with respect to both data and logic) of the provenance of the model. More specifically, the inferential model and associated mathematical operations can be represented using an expression tree stored in a complex JSON record in the RDBMS, wherein an SQL-JSON function is used to manipulate the complex JSON record. An exemplary model in the form of a JSON binary data type is illustrated in FIG. 8.

Training

Figure 9:
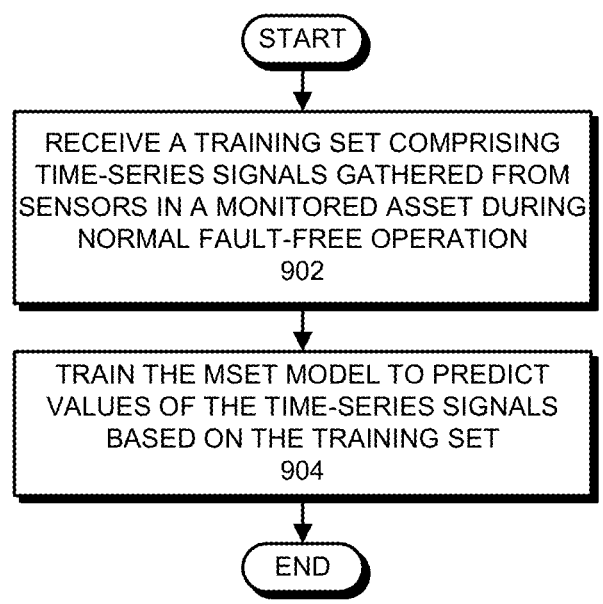
FIG. 9 presents a flow chart illustrating the model-training process in accordance with the disclosed embodiments.

FIG. 9 presents a flow chart illustrating a process for initially training an MSET model in accordance with the disclosed embodiments. During a training mode, which precedes the surveillance mode, the system receives a training set comprising time-series signals gathered from sensors in a monitored asset during normal fault-free operation (step 902). The system then trains the MSET model to predict values of the time-series signals based on the training set (step 904).

Detecting Anomalies

Figure 10:
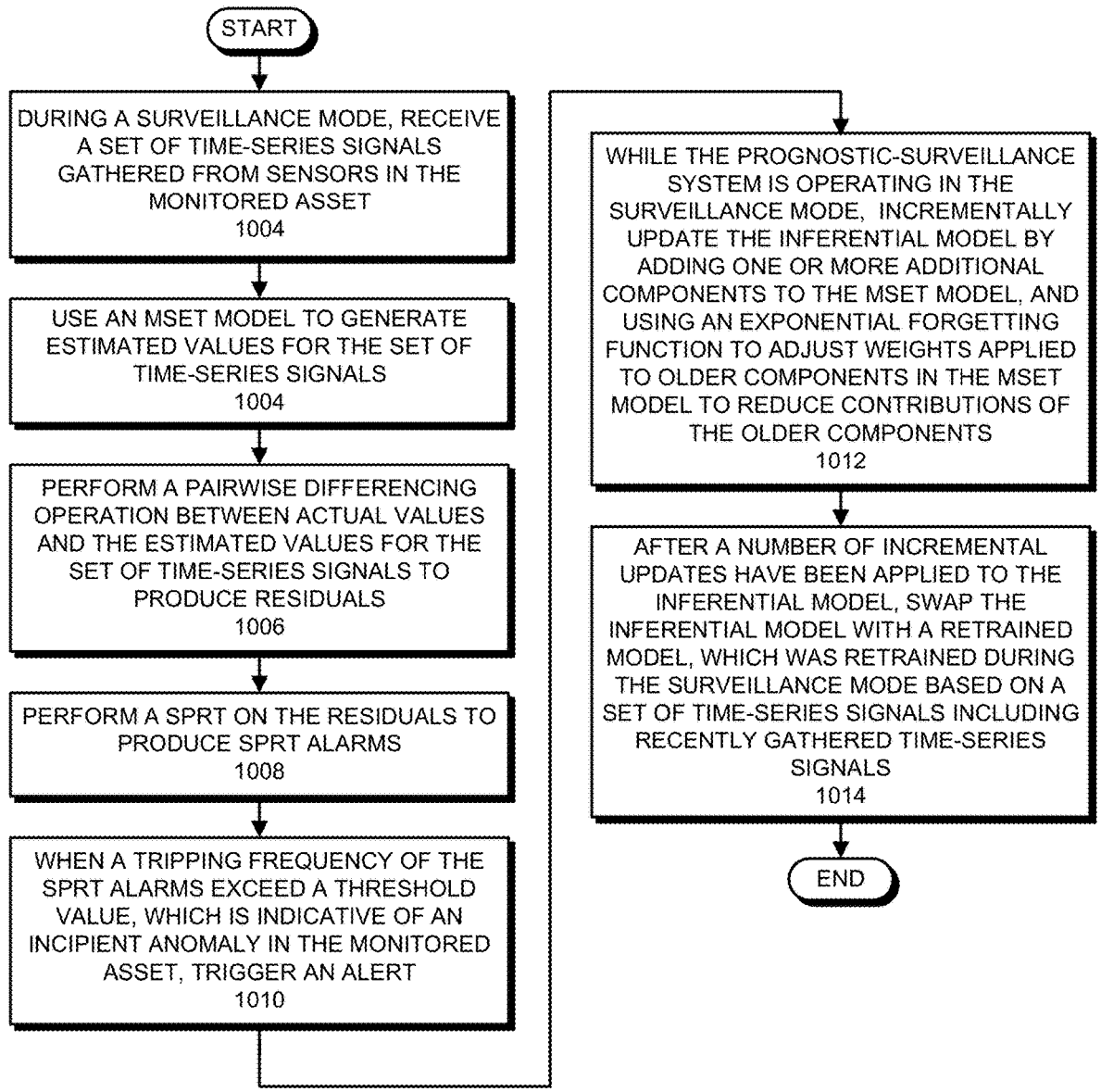
FIG. 10 presents a flow chart illustrating prognostic-surveillance operations and dynamic model updating operations in accordance with the disclosed embodiments.

FIG. 10 presents a flow chart illustrating a process for detecting anomalies in an asset under surveillance based on time-series signals in accordance with the disclosed embodiments. During a surveillance mode, the system receives a set of time-series signals gathered from sensors in the monitored asset (step 1002). Next, the system uses an MSET model to generate estimated values for the set of time-series signals (step 1004). The system then performs a pairwise differencing operation between actual values and the estimated values for the set of time-series signals to produce residuals (step 1006). Next, the system performs a sequential probability ratio test (SPRT) on the residuals to produce SPRT alarms (step 1008). Then, when a tripping frequency of the SPRT alarms exceeds a threshold value, which is indicative of an incipient anomaly in the monitored asset, the system triggers an alert (step 1010). Also, while the prognostic-surveillance system is operating in the surveillance mode, the system incrementally updates the inferential model by adding one or more additional components to the MSET model, and using an exponential forgetting function to adjust weights applied to older components in the MSET model to reduce contributions of the older components (step 1012). Then, after a number of incremental updates have been applied to the inferential model, the system swaps the inferential model with a retrained model, which was retrained during the surveillance mode based on a set of time-series signals including recently gathered time-series signals (step 1014).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing prognostic-surveillance operations based on an inferential model that dynamically adapts to evolving operational characteristics of a monitored asset, wherein during a surveillance mode for a prognostic-surveillance system, the method comprises:
receiving a set of time-series signals gathered from sensors in the monitored asset;
using an inferential model to generate estimated values for the set of time-series signals;
determining whether the estimated values diverge from actual values for the set of time-series signals;
if the estimated values are determined to diverge, which is indicative of an incipient anomaly in the monitored asset, triggering an alert;
while the prognostic-surveillance system is operating in the surveillance mode, incrementally updating the inferential model based on the time-series signals, wherein incrementally updating the inferential model includes at least one of:
adding one or more additional weighted components to the inferential model; and
adjusting weights to older components in the inferential model to reduce contributions of the older components; and
after one or more incremental updates have been applied to the inferential model, swapping the updated inferential model with a retrained model that was retrained during the surveillance mode based on a set of time-series signals including recently gathered time-series signals.

2. The method of claim 1, wherein determining whether the estimated values diverge from the actual values comprises:
performing a pairwise differencing operation between actual values and the estimated values for the set of time-series signals to produce residuals;
performing a sequential probability ratio test (SPRT) on the residuals to produce SPRT alarms; and
determining that the estimated values diverge from the actual values when a tripping frequency of the SPRT alarms exceeds a threshold value.

3. The method of claim 1, wherein the inferential model comprises a Multivariate State Estimation Technique (MSET) model.

4. The method of claim 3, wherein incrementally updating the MSET model involves adding one or more additional components to the MSET model, and using an exponential forgetting function to adjust weights applied to older components in the MSET model to reduce contributions of the older components.

5. The method of claim 4, wherein incrementally updating the MSET model involves using the Sherman-Morrison-Woodbury formula to perform matrix-inversion operations involved in incrementally updating the MSET model.

6. The method of claim 1, wherein the inferential model is periodically retrained during the surveillance mode and is stored in a library to facilitate subsequent swapping operations.

7. The method of claim 1, wherein the inferential model is continuously retrained during the surveillance mode to facilitate swapping in a retrained model, which is as up-to-date as possible.

8. The method of claim 1, wherein the method is performed using a relational database management system (RDBMS), which includes structured query language (SQL) constructs that support operations involving the inferential model.

9. The method of claim 8, wherein the structured SQL constructs include an SQL data definition language (DDL) statement, which enables a table storing MSET monitored data to activate evolving Multivariate State Estimation Technique (EMSET) operations.

10. The method of claim 9, wherein the structured SQL constructs include a table function that users can call to list all EMSET models detected so far with input data after the table is activated for EMSET monitoring, which facilitates tracing an evolutional history of MSET models associated with data stored in the table.

11. The method of claim 8, wherein the inferential model and associated mathematical operations are represented using an expression tree stored in a complex JavaScript Object Notation (JSON) record in the RDBMS, wherein an SQL-JSON function is used to manipulate the complex JSON record.

12. The method of claim 1, wherein the time-series signals gathered from sensors in the monitored asset include signals specifying one or more of the following:
temperatures;
currents;
voltages;
resistances;
capacitances;
vibrations;
cooling system parameters; and
control signals.

13. A non-transitory, computer-readable storage medium storing instructions that when executed by a computer cause the computer to perform a method for performing prognostic-surveillance operations based on an inferential model that dynamically adapts to evolving operational characteristics of a monitored asset, wherein during a surveillance mode for a prognostic-surveillance system, the method comprises:
receiving a set of time-series signals gathered from sensors in the monitored asset;
determining whether the estimated values diverge from actual values for the set of time-series signals;
if the estimated values are determined to diverge, which is indicative of an incipient anomaly in the monitored asset, triggering an alert;
while the prognostic-surveillance system is operating in the surveillance mode, incrementally updating the inferential model based on the time-series signals, wherein incrementally updating the inferential model includes at least one of:
adding one or more additional weighted components to the inferential model; and
adjusting weights to older components in the inferential model to reduce contributions of the older components; and after one or more incremental updates have been applied to the inferential model, swapping the updated inferential model with a retrained model that was retrained during the surveillance mode based on a set of time-series signals including recently gathered time-series signals.

14. The non-transitory, computer-readable storage medium of claim 13, wherein determining whether the estimated values diverge from the actual values comprises:
performing a pairwise differencing operation between actual values and the estimated values for the set of time-series signals to produce residuals;
performing a sequential probability ratio test (SPRT) on the residuals to produce SPRT alarms; and
determining that the estimated values diverge from the actual values when a tripping frequency of the SPRT alarms exceeds a threshold value.

15. The non-transitory, computer-readable storage medium of claim 13, wherein the inferential model comprises a Multivariate State Estimation Technique (MSET) model.

16. The non-transitory, computer-readable storage medium of claim 15, wherein incrementally updating the MSET model involves adding one or more additional components to the MSET model, and using an exponential forgetting function to adjust weights applied to older components in the MSET model to reduce contributions of the older components.

17. The non-transitory, computer-readable storage medium of claim 16, wherein incrementally updating the MSET model involves using the Sherman-Morrison-Woodbury formula to perform matrix-inversion operations involved in incrementally updating the MSET model.

18. A system performing prognostic-surveillance operations based on an inferential model that dynamically adapts to evolving operational characteristics of a monitored asset, comprising:
at least one processor and at least one associated memory; and
an execution mechanism that executes on the at least one processor, wherein during a surveillance mode, the execution mechanism:
  receives a set of time-series signals gathered from sensors in the monitored asset;
  uses an inferential model to generate estimated values for the set of time-series signals;
  performs a pairwise differencing operation between actual values and the estimated values for the set of time-series signals to produce residuals;
  performs a sequential probability ratio test (SPRT) on the residuals to produce SPRT alarms;
  when a tripping frequency of the SPRT alarms exceeds a threshold value, which is indicative of an incipient anomaly in the monitored asset, triggers an alert; and
  while the prognostic-surveillance system is operating in the surveillance mode, incrementally updates the inferential model based on the time-series signals, wherein incrementally updating the inferential model includes at least one of:
    adding one or more additional weighted components to the inferential model; and
    adjusting weights to older components in the inferential model to reduce contributions of the older components; and
  after one or more incremental updates have been applied to the inferential model, swaps the updated inferential model with a retrained model that was retrained during the surveillance mode based on a set of time-series signals including recently gathered time-series signals.

* * * * *